United States Patent
Burch et al.

(10) Patent No.: US 9,245,103 B2
(45) Date of Patent: Jan. 26, 2016

(54) PERSONAL AUTHENTICATION AND ACCESS

(71) Applicant: Novell, Inc., Provo, UT (US)

(72) Inventors: Lloyd Leon Burch, Payson, UT (US); Robert Skousen Stilmar, Payson, UT (US); Duane Fredrick Buss, West Mountain, UT (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 0 days.

(21) Appl. No.: 14/230,899

(22) Filed: Mar. 31, 2014

(65) Prior Publication Data

US 2015/0278500 A1    Oct. 1, 2015

(51) Int. Cl.
*G06F 21/00* (2013.01)
*G06F 21/33* (2013.01)

(52) U.S. Cl.
CPC ..................................... *G06F 21/33* (2013.01)

(58) Field of Classification Search
CPC combination set(s) only.
See application file for complete search history.

(56) References Cited

U.S. PATENT DOCUMENTS

| | | | |
|---|---|---|---|
| 8,171,298 B2 | 5/2012 | Ramaswamy | |
| 8,387,121 B1 | 2/2013 | Surti | |
| 8,548,982 B2 | 10/2013 | Weissman | |
| 8,650,628 B2 | 2/2014 | Lam | |
| 2004/0255137 A1* | 12/2004 | Ying | 713/193 |
| 2005/0044411 A1* | 2/2005 | Somin et al. | 713/201 |
| 2006/0230462 A1 | 10/2006 | Prabakar | |

* cited by examiner

*Primary Examiner* — Ghazal Shehni
(74) *Attorney, Agent, or Firm* — Schwegman Lundberg & Woessner, P.A.

(57) ABSTRACT

A user of a system defines a limited use access token for an external user for that external user to access defined resources of the system based on the user's account with the system. An access control system validates the access token when the external user attempts to access the defined resources and grants the external principal access to the defined resources.

20 Claims, 4 Drawing Sheets

PERSONAL AUTHENTICATION AND ACCESS

BACKGROUND

Today people have a variety of accounts to services over a variety of networks. These accounts range from social networking services and online banking services to work services and retail loyalty services. Individuals manage a variety of user names and passwords for each of these services. Moreover, user name and password requirements can change based on newly imposed security requirements by the services. The situation has become increasingly difficult for users to effectively manage their online services.

Furthermore, often a user wants to share information with other people or services that are not a part of a same corporate/service directory or identity system. The shared information can be attributes of the user's identity such as name, company/service identifier (ID), or other user identity data. The user may also need to share other data or services that may be protected by an access control system, such as files or applications.

For example, a user may want to use a tax product to logon to a user's investment service and acquire tax documents that are automatically downloaded to the tax product for assisting the user in filing his/her taxes. The only mechanism available for this to occur today is for the user to provide the tax product with the user's ID and password into the investment service, often this makes the user nervous about giving credentials because if the tax product were to become compromised, the user's investment account could be easily compromised.

Although it is possible for and administrator to move files and resources to an isolated system that allows controlled public access to limited resources of a user, this requires more work than it may be worth; as such, this is infrequently, if ever, done. Furthermore, this situation creates a liability problem for a company, since the user's private data is exposed to leakage, without user permission. So, as more and more personal data (which a user desires to share with others) is held by corporate, governmental, and educational systems, the management and security of that personal data becomes more complex and costly.

SUMMARY

Various embodiments of the invention provide techniques for personal authentication and access. In an embodiment, a method for customized authentication and access is presented.

Specifically, a principal identifier for a granting principal, a resource identifier for a resource, and access rights for the granted principal to access the resource are received. Next, an access token is created that includes the granting principal identifier, the resource identifier, and the access rights. Finally, the access token is sent to the granted principal for use in accessing the resource; the granted principal lacks an account with a system that controls the resource.

DETAILED DESCRIPTION

Figure 1:
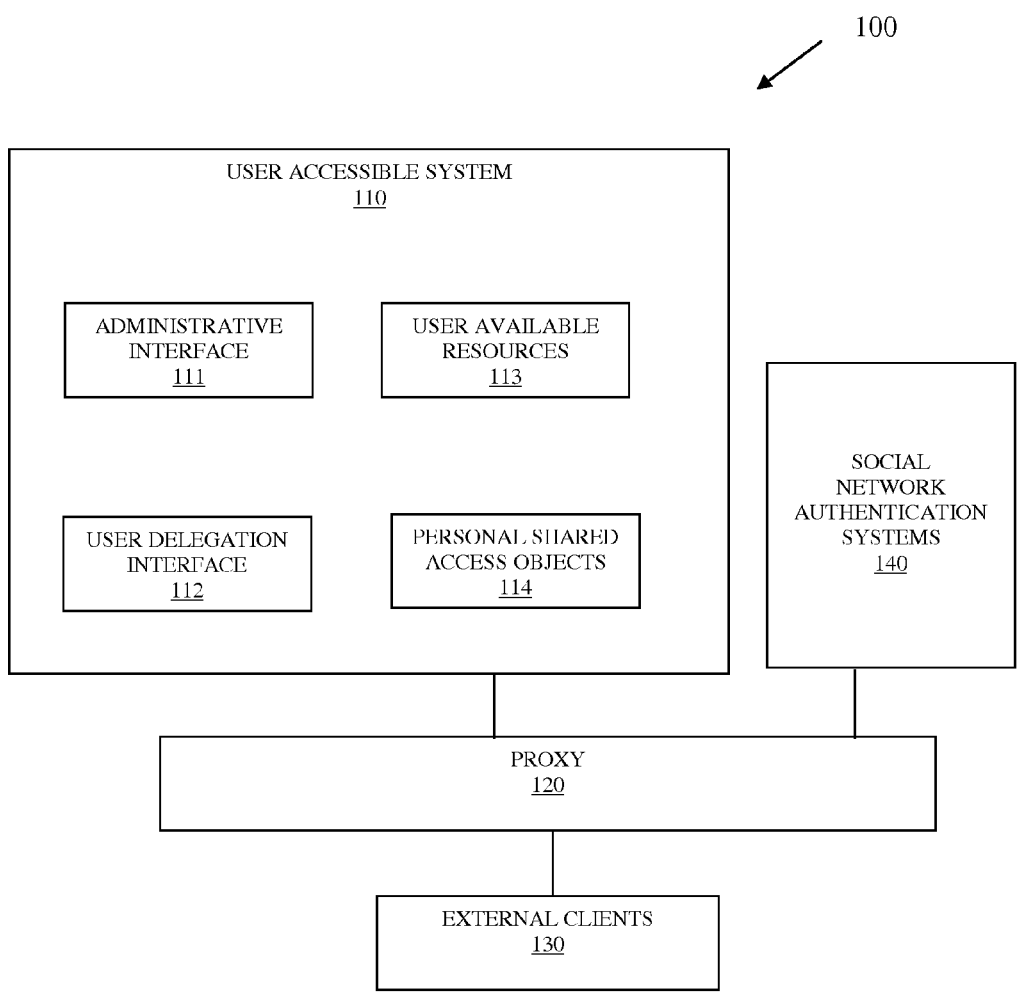
FIG. 1 is a diagram depicting an architecture for practicing customized authentication and access, according to an example embodiment presented herein.

A "resource" includes a user, service, system, device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented as enhancements within existing network architectures.

Also, the techniques presented herein are implemented in (and reside within) machines, such as processor(s) or processor-enabled devices (hardware processors). These machines are configured and programmed to specifically perform the processing of the methods and system presented herein. Moreover, the methods and system are implemented and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1-4.

FIG. 1 is a diagram depicting an architecture 100 for practicing customized authentication and access, according to an example embodiment presented herein.

The architecture 100 of the FIG. 1 is shown for purposes of illustration of particular embodiments of the invention; it is noted that other embodiments of the invention (FIGS. 2-4) need not be limited to the architecture 100 of the FIG. 1, as other hardware and software architectures can be used as well.

As embodiments herein and below will demonstrate, a principal of a user accessible system 110 can create Personal Shared Access Objects (PSAOs) 114 to grant or delegate a different principal temporary and controlled access to particular user-available resources 113. This can be done without creating a separate controlled environment for the different principal to perform the access and can be done even when the different principal entirely lacks an account or access to the user-accessible system 110.

The architecture 100 includes a user-accessible system 110, a proxy 120, one or more external clients 130, and, optionally, one or more social network authentication systems 140. The user-accessible system 110 includes an administrative interface 111, a user delegation interface 112, PSAOs 114, and user available resources 113.

The user-accessible system 110 is an online-accessible processing environment for which a user has an account. This can be a corporate environment for which the user is an employee or a variety of other network services of the user (such as online banking, retail loyalty systems, social networking systems, government systems, and the like).

The administrative interface 111 is for an administrator to define policy that restricts a user to providing delegated access within the user-accessible system 110 to just administrative defined user available resources 113. That is, some resources available to a user, an administrator may wish to prevent the user from delegating access to, such as the user's account name, user's credentials, user's credit card, etc. So, the administrative interface 111 permits an administrator to custom define the metes and bounds of access that a user can delegate to an external principal (external to the user's account on the user-accessible system 110 or external to the user-accessible system 110).

In an embodiment, the administrative interface 111 is a Graphical User Interface (GUI).

In an embodiment, the administrative interface 111 is an Application Programming Interface (API) having a variety of operations permitting the administrative interface 111 to interact with automated applications/services to define the metes and bounds of delegation by a user.

The user delegation interface 112 permits a user to define and create the PSAOs 114, which grants access to specified user available resources 113 to principals associated with external clients 130.

In an embodiment, the user delegation interface 112 is a GUI.

In an embodiment, the user delegation interface 112 is an API to permit some or all aspects of a PSAO 114 to be defined by an automated application/service.

The user available resources 113 are files, directories, data, devices, and/or applications that a user is permitted to delegate access to and that the user has created a PSAO 114 for an external principal to access.

The PSAOs 114 includes an access token and can include a variety of other information embedded or associated with the PSAOs 114.

In an embodiment, each PSAO 114 includes: 1) a list of access roles to be granted for an external principal to access specified user available resources 113; 2) identity of the external principal (user or automated service) that access is to be granted (such as email address or list of emails); 3) any identity information required in addition to the PSAO 114 to gain access (additional authentication data required of the external principal); 4) any additional authentication requirements to be made of the external principal (such as a successful social networking authentication via the social network authentication system 140); a time-to-live (TTL) attribute that is set on the PSAO 114 (such as 90 days from the date of creating the PSAO 114)—this can also be based on transaction (such as one access by the external principal or N accesses by the external principal); 6) token or key that is to be presented to the proxy 120 for the external principal to gain access from an external client 130 to the user-accessible system 110 and the user available resources 113; and 7) a pointer to the delegating user's identity when the PSAO 114 is not stored as part of the user's identity within the user accessible system 110.

Once the PSAO 114 is created and stored, it can be delivered to the external principal in a variety of customized manners, such as via an email to the external principal (external principal being a different user from the user that created the PSAO 114).

The proxy 120 is trusted to and authenticated to the user accessible system 110. The proxy 120 allows or denies access to the user-accessible system 110 based on the access tokens (portion of the PSAO 114). The access token serves as a key for the external principal to access the user available resources 113.

In an embodiment, the proxy 120 is a Hypertext Transfer Protocol (HTTP) proxy gateway.

Optionally, the architecture 100 includes one or more social network authentication systems 140. The social network authentication systems 140 can be used by the proxy 120 to perform additional authentication on the external principal if defined in the PSAO 114 used by the external principal to access the user available resources 113. Once the external principal logs into a social network site, the corresponding social network authentication system 140 returns an access token and some social network identity information from the external principal, which can be used by the proxy 120 to satisfy an authentication defined in the PSAO 114.

The architecture 100 permits an end user to request access tokens (a portion of the PSAO 114), which will grant limited access to selective user available resources 113. These access tokens can be sent to and used by non users of the user accessible system 110. It is not required for the for the non system user to have an account of any kind on the user accessible system 110. Although, in an embodiment, the user may have an account with the user accessible system 110 but is accessing the user accessible system 110 via a delegating user's account using the PSAO 114.

In an embodiment, the access token may have a requirement that a login from the external client 130 must be performed as part of the authentication of the external principal using the access token. An example of this other login could be through the social network authentication system 140, such as a FaceBook® authentication system.

Consider the following operational scenario of the architecture 100 to more fully appreciate the beneficial aspects of various embodiments for the invention.

A student at a college needs to allow her grandfather to pay her tuition. The grandfather does not have an account at the college. To be able to pay the tuition the grandfather needs access to her name, enrollment status, amount owed by the student to the college, and the student's ID. He may also like to see her grades before he spends his money. The embodiments presented herein allow the student to enable her grandfather access to limited data for a limited time. She can revoke the access at any time and can track usage of the access token.

In this example, the grandfather is the external principal, the student is the user, the university grading and payment service is the user accessible system 110, and the grades and tuition payment service is the user available resources 113.

When the grandfather uses the access token granted by the student there is limited identity information that is used for the audit trail. This identity can be as thin as an email address or may include information from a social identity account or data entered by the grandfather. This identity can be used to generate reports for the student, the administrator or the grandfather for tax records.

So, the student uses the user delegation interface 112 to create an instance of a PSAO 114 for the grandfather and enters an email address of her grandfather, and selects the rights she would like to grant. In this case the student wishes to grant access to her student information, such as grades and also to allow the payment of her tuition. This action creates the instance of the PSAO 114.

Once the PSAO 114 is created and stored, an email message is sent to the email address of the grandfather. The email message contains an invitation from the student to the grandfather to help pay. It also includes a link that points to the payment page and includes the access token, described above in, the Uniform Resource Locator (URL) link.

The grandfather selects the link by clicking on the link from the external client 130 (device of the grandfather). The proxy 120 reads the token and does a look up to find the PSAO 114 and the user that the PSAO 114 belongs to. The PSAO 114 is validated, and checked for other requirements. If the student user has required additional identity information the grandfather will be prompted to enter the information. If the student user has required additional authentication, such as a Facebook® the grandfather will be sent to Facebook® (one of the social network authentication system 140) for authentication. The Facebook® authentication requirement may be for specific identity, an identity belonging to group or any identity known to Facebook®. In this use case the grandfather must be member of the "MyFamily" group. After the Facebook® authentication, additional data may be collected from Facebook®. The grandfather is now allowed access to the resources protected by the invention and checks his granddaughter's grades and then pays her tuition fees. In an embodiment, the actions are logged and include the identity of the grandfather (external principal) and the identity of the student (grantor). Any additional identity data collected may also be included in the log or audit.

The student now goes to user interface 112 and can see that her grandfather has accessed her information. This may include any information that her grandfather entered or that was read from Facebook®. She can also see all grants that she has given to him and others, and when those rights will expire. She may choose to delete any valid access grants at any time. She may also add new grants by creating new PSAOs 114 or modifying existing PSAOs 114.

Previous access control systems are built around an administrator controlled system. This architecture 100 is built around a user controlled system. An administrator enables the feature for the end user via the administrative interface 111 allowing the end user to grant access through the user delegation interface 112. The end user builds, stores, distributes and controls access tokens as instances of PSAOs 114. The end user can build the policy of authentication requirements of the token. This policy can be of type "BEARER", which means if a principal has the token that principal can use it. The user can also add authentication requirements that use social network authentication systems 140, such as LinkedIn®, Facebook®, Instagram®, Google Plus®, and/or others. Therefore, the PSAO 114 can require one or more social network authentication systems 140. The social network authentication systems 140 may define person(s), group(s) or anonymous authenticated users. This allows the end user to send a single PSAO 114 to one or more people, and requires the recipient(s) to be a member of defined group in a social network. Information from the social network can be used to describe the person making the access.

The techniques deploy a proxy driven access control system, but it can also be used as part of any "federated" system. Because the system is token based, the token can be treated as a federation token and brokered to the architecture 100 for processing.

Figure 2:
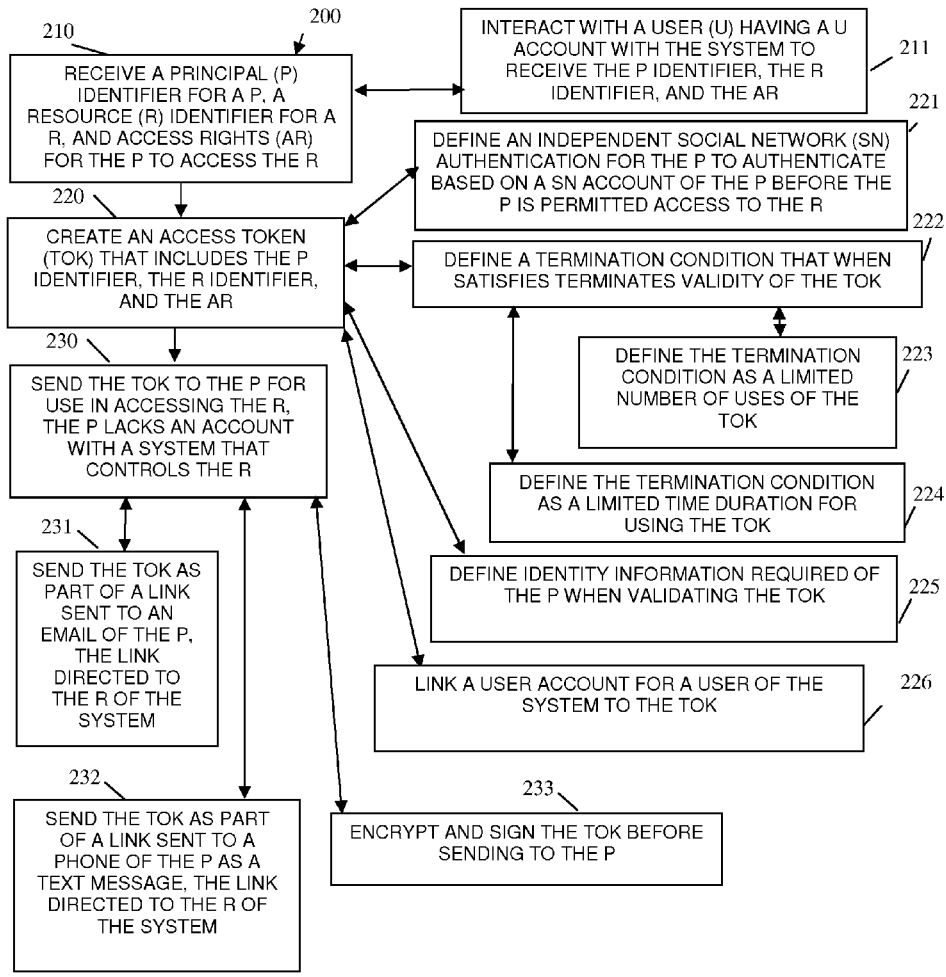
FIG. 2 is a diagram of a method for customized authentication and access, according to an example embodiment.
Figure 3:
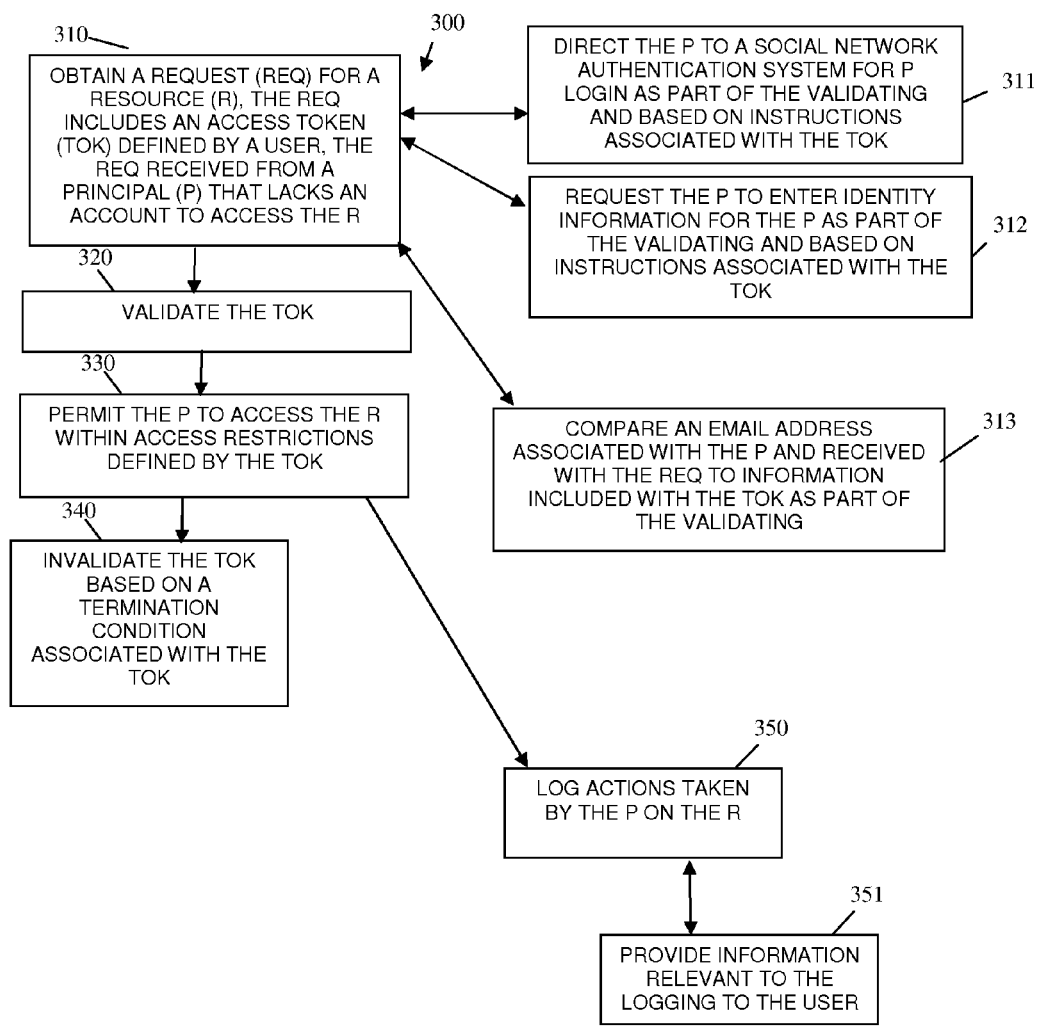
FIG. 3 is a diagram of another method for customized authentication and access, according to an example embodiment.
Figure 4:
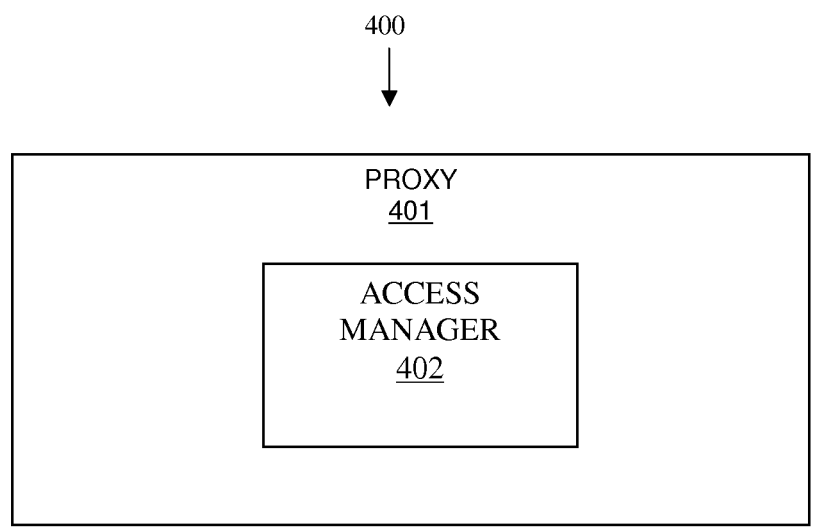
FIG. 4 is a diagram of a customized authentication and access system, according to an embodiment.

Aspects of the embodiments discussed above and other embodiments are now presented with the discussion of the FIGS. 2-4.

FIG. 2 is a diagram of a method 200 for customized authentication and access, according to an example embodiment. The method 200 is implemented as one or more software modules (herein after referred to as "delegation manager"). The delegation manager includes executable instructions that are implemented, programmed, and resides within memory and/or a non-transitory machine-readable storage media; the executable instructions execute on one or more processors of a server device and have access to one or more network connections associated with one or more networks. The networks may be wired, wireless, or a combination of wired and wireless.

In an embodiment, the delegation manager processes on hardware platforms associated with a cloud environment.

In an embodiment, the delegation manager processes on user accessible system 110 of the FIG. 1.

In an embodiment, the delegation manager is provided as a Software as a Service (SaaS).

In an embodiment, the delegation manager is a combination of the administrative interface 111 and the user interface 112 of the user accessible system 110 of the FIG. 1.

At 210, the delegation manager receives a principal identifier for a principal (user or automated service), a resource identifier for a resource, and access rights (roles and security permissions for those roles) for the principal to access the resource.

According to an embodiment, at 211, the delegation manager interacts with a user who has an account with the system (described below at 230) to receive the principal identifier, the resource identifier, and the access rights. That is, the user defines attributes for granting access to the resource. The resource controlled by the system and the user having an account and access to the system and the resource controlled by the system.

At 220, the delegation manager creates an access token that includes the principal identifier, the resource identifier, and the access rights.

In an embodiment, the access token is an instance of the PSAO 114 of the FIG. 1.

In an embodiment, at 221, the delegation manager defines an independent social network authentication for the principal to authenticate based on a social network account of the principal before the principal is permitted access to the resource. This was described above with reference to the FIG. 1 and the social networking authentication systems 140. The social network is not related and is independent of the system having the resource.

According to an embodiment, at 222, the delegation manager defines a termination condition that when satisfied terminates validity of the access token. The termination condition can be defined dynamically, such as via a manual revocation issued from the user that initially defined the access token for the principal, or the termination condition can be defined and embedded in the access token and defined by the user.

For example, at 223, the delegation manager defines the termination condition as a limited number of uses of the token made by the principal or perhaps a set of principals having the access token. This can range from a single use to multiple uses.

In another example, at 224, the delegation manager defines the termination condition as a limited time duration for the principal to use the access token. For example, the access token is valid for 1 hour after it was initially created (creation date can be part of or associated with the access token).

In an embodiment, at 225, the delegation manager defines identity information required of the principal when validating the token. Again, the type of identity information can be provided by the user of the system when establishing the access token.

According to an embodiment, at 226, the delegation manager links a user account for a user of the system (having the resource) to the access token. That is, the principal's access, via the access token, to the resource of the system is tied to the creating user's access to the resource and the system.

At 230, the delegation manager sends the access token to the principal for the principal to use in accessing the resource. Again, the principal lacks an account with a system that controls the resource and is piggybacking on the user's authorization for access to the resource and the system. Moreover, the resource can be data or an application service of the system (as stated above).

In an embodiment, at 231, the delegation manager sends the token as part of a link to an email of the principal. The link is directed to the resource of the system.

In an embodiment, at 232, the delegation manager sends the access token as part of a link sent to a phone of the principal as a text message. The link directed to the resource of the system.

According to an embodiment, at 233, the delegation manager encrypts and signs the token before sending to the principal.

FIG. 3 is a diagram of another method 300 for customized authentication and access, according to an example embodiment. The method 300 is implemented as one or more software module(s) on a proxy (herein after referred to as "proxy"). The one or more software module are represented as executable instructions that are implemented, programmed, and resides within memory and/or a non-transitory machine-readable storage medium; the executable instructions execute on one or more processors of the proxy and have access to one or more network connections associated with one or more networks. The networks may be wired, wireless, or a combination of wired and wireless.

In an embodiment, the proxy is the proxy 120 of the FIG. 1.

At 310, the proxy obtains a request for a resource. The request includes an access token defined by an end user of a system having a resource. The request received from a principal that lacks an account to access the resource.

According to an embodiment, at 311, the proxy directs the principal to a social network authentication system (such as social network authentication system 140) as part of validating (320) and based on instructions (authentication mechanism) associated with the access token.

In an embodiment, at 312, the proxy requests the principal to enter identity information for the principal as part of the validating (320) and based on instructions associated with the access token.

In an embodiment, at 313, the proxy compares an email address associated with the principal that is received with the request to information included with the access token as part of the validating (320).

At 320, the proxy validates the access token.

At 330, the proxy permits the principal to access the resource within access restrictions defined by the access token.

In an embodiment, the access token is the PSAO 114 of the FIG. 1.

In an embodiment, at 340, the proxy invalidates the token based on a termination condition associated with the access token.

In an embodiment, at 350, the proxy logs actions taken by the principal on the resource when the principal accesses the resource.

In an embodiment of 350 and at 351, the proxy provides the information relevant to the logging of the principal. Therefore, the user can track how and when the principal used the access token to access the resource.

FIG. 4 is a diagram of a customized authentication and access system 400, according to an embodiment. Various components of the customized authentication and access system 400 are software module(s) represented as executable instructions, which are programed and/or reside within memory and/or non-transitory computer-readable storage media for execution by one or more devices. The components and the devices have access to one or more network connections over one or more networks, which are wired, wireless, or a combination of wired and wireless.

According to an embodiment, the customized authentication and access system 400 implements, in whole or in part and inter alia, various features of the FIGS. 1-3.

The customized authentication and access system 400 includes a proxy 401 and an access manager 402.

The proxy 401 includes one or more processors, memory, and non-volatile storage.

In an embodiment, the proxy 401 is a cloud processing environment.

In an embodiment, the proxy 401 is the proxy 120 of the FIG. 1.

In an embodiment, the proxy 401 is part of the user accessible system 110 of the FIG. 1.

The proxy 401 includes the access manager 402.

The access manager 402 is implemented as one or more software modules having executable instructions that execute on the one or more processors of the proxy 401. The access manager 402 is configured and adapted to: detect a request received from a principal (a user or automated service), the request directed to a resource of a system; validate an access token associated with the request; and grant the principal access to the resource when the access token is validated. It is noted that the principal lacks an account necessary to access the resource (the principal may also lack an account to the system that controls the resource). Additionally, the access token provides the principal access to the resource when properly validated, and the access token is defined and customized by a user that has a user account for accessing the resource and the system controlling the resource.

In an embodiment, the access token is the PSAO 114 of the FIG. 1.

According to an embodiment, the access manager 402 requires the principal (during validation of the access token) to successfully authenticate to a social network account of the principal. This was discussed above in detail with reference to the FIG. 1.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   receiving, by a delegation manager executing on a server, a principal identifier for a principal, a resource identifier for a resource, and access rights for the principal to access the resource;
   creating, by the delegation manager, an access token including the principal identifier, the resource identifier, and the access right, wherein creating further includes presenting an interface to an initiating principal for defining and creating a Personal Shared Access Object (PSAO) that includes the access token, a principal identity for the principal identifier, and a link to an initiating principal identity for the initiating principal, the initiating principal has rights to the resource; and
   sending, by the delegation manager, the access token to the principal for use in accessing the resource, wherein the principal lacks an account with a system that controls the resource, and wherein when the principal presents the access token to the resource, the resource authenticates the principal and controls the principal's access to the resource based on the PSAO and access to the resource occurs through the principal identity.

2. The method of claim 1, wherein receiving further includes interacting with a user having a user account with the system to receive the principal identifier, the resource identifier, and the access rights, wherein the user is the initiating principal.

3. The method of claim 1, wherein creating further includes defining an independent social network authentication for the principal to authenticate based on a social network account of the principal before the principal is permitted access to the resource.

4. The method of claim 1, wherein creating further includes defining a termination condition that when satisfies terminates validity of the access token.

5. The method of claim 4, wherein defining further includes defining the termination condition as a limited number of uses of the access token.

6. The method of claim 4, wherein defining further includes defining the termination condition as a limited time duration for using the access token.

7. The method of claim 1, wherein creating further includes defining identity information required of the principal when validating the access token.

8. The method of claim 1, wherein creating further includes linking a user account for a user of the system to the access token, wherein the user is the initiating principal.

9. The method of claim 1, wherein sending further includes sending the access token as part of a link sent to an email of the principal, the link directed to the resource of the system.

10. The method of claim 1, wherein sending further includes sending the access token as part of a link sent to a phone of the principal as a text message, the link directed to the resource of the system.

11. The method of claim 1, wherein sending further includes encrypting and signing the access token before sending to the principal.

12. A method, comprising:
    obtaining, by a proxy, a request for a resource, the request including an access token defined by a user, the request received from a principal that lacks an account to access the resource;
    validating, by the proxy, the access token using a Personal Shared Access Object (PSAO) defined by the user, the PSAO includes the access token, a principal identity for the principal, and a link to a user identity for the user, the user has rights to the resource; and
    permitting, by the proxy, the principal to access the resource within access restrictions defined by the validated access token and the PSAO, wherein access to the resource occurs through the principal identity.

13. The method of claim 12 further comprising, invalidating, by the proxy, the access token based on a termination condition associated with the access token.

14. The method of claim 12, further comprising, logging, by the proxy, actions taken by the principal on the resource.

15. The method of claim 14, wherein logging further includes providing information relevant to the logging to the user.

16. The method of claim 12, wherein validating further includes directing the principal to a social network authentication system for principal login as part of the validating and based on instructions associated with the access token.

17. The method of claim 12, wherein validating further includes requesting the principal to enter identity information for the principal as part of the validating and based on instructions associated with the access token.

18. The method of claim 12, wherein validating further includes comparing an email address associated with the principal and received with the request to information included with the access token as part of the validating.

19. A system, comprising:
    a proxy;
    an access manager adapted and configured to: i) execute on the proxy, ii) detect a request received from a principal for access to a resource, iii) validate an access token associated with the request using a Personal Shared Access Object (PSAO) defined by a user, the PSAO includes the access token, a principal identity for the principal, and a link to a user identity for the user, the user having rights to the resource, and iv) grant the principal access to the resource when the access token is validated, wherein the principal lacks an account necessary to access the resource and the access token provides access, and the user has a user account for access to the resource, and wherein access to the resource occurs through the principal identity.

20. The system of claim 19, wherein iii) further includes v) requiring the principal to successfully authentication to a social network account of the principal as part of validating the access token.

* * * * *